United States Patent
Leleux et al.

(10) Patent No.: US 8,997,867 B2
(45) Date of Patent: Apr. 7, 2015

(54) USE OF A FLUID COMPOSITION WITH DELAYED CROSS-LINKING FOR HOLDING A CASING INSIDE A DRILL HOLE AND METHOD FOR REINFORCING A DRILL HOLE

(75) Inventors: Jérome Leleux, Melun (FR); Nicolas Leblond, Andresy (FR); Hervé Cavalie, Senlis (FR); Philippe Thepot, Villeneuve sur Verberie (FR)

(73) Assignees: Cray Valley SA, Courbevoie (FR); Total Marketing Services, Puteaux (FR)

( * ) Notice: Subject to any disclaimer, the term of this patent is extended or adjusted under 35 U.S.C. 154(b) by 861 days.

(21) Appl. No.: 12/665,286

(22) PCT Filed: Jun. 17, 2008

(86) PCT No.: PCT/FR2008/000842
§ 371 (c)(1),
(2), (4) Date: May 11, 2010

(87) PCT Pub. No.: WO2009/010659
PCT Pub. Date: Jan. 22, 2009

(65) Prior Publication Data
US 2010/0218953 A1    Sep. 2, 2010

(30) Foreign Application Priority Data
Jun. 19, 2007 (FR) ..................................... 07 04376

(51) Int. Cl.
*E21B 33/14* (2006.01)
*E21B 36/00* (2006.01)
*C04B 26/16* (2006.01)
*C04B 28/02* (2006.01)
*C08G 18/08* (2006.01)
*C08G 18/69* (2006.01)
*C09K 8/44* (2006.01)
*C04B 111/00* (2006.01)

(52) U.S. Cl.
CPC ............... *E21B 36/003* (2013.01); *C04B 26/16* (2013.01); *C04B 28/02* (2013.01); *C04B 2111/00706* (2013.01); *C08G 18/089* (2013.01); *C08G 18/69* (2013.01); *C09K 8/44* (2013.01)

(58) Field of Classification Search
USPC .................................................. 166/284, 285
See application file for complete search history.

(56) References Cited

U.S. PATENT DOCUMENTS 3,379,253 A * 4/1968 Chism ........................... 166/295
3,456,735 A * 7/1969 McDougall et al. .......... 166/304
(Continued)

FOREIGN PATENT DOCUMENTS

EP    0 436 230    7/1991
EP    0 500 345    8/1992
(Continued)

*Primary Examiner* — Zakiya W Bates
*Assistant Examiner* — Silvana Runyan
(74) *Attorney, Agent, or Firm* — Harness, Dickey & Pierce, P.L.C.

(57) ABSTRACT

A cross-linkable composition with controlled cross-linking as a material is used for fixing and thermally insulating tubes used for casing in drill holes, especially oil drill holes, during exploitation operations, such as oil extraction, in the drill hole. The cross-linkable composition includes at least one diene polyol, at least one polyisocyanate, and at least one heat insulating liquid filler.

16 Claims, 1 Drawing Sheet

(56) References Cited

U.S. PATENT DOCUMENTS

| | | | |
|---|---|---|---|
| 3,637,019 A * | 1/1972 | Lee | 166/295 |
| 3,794,358 A | 2/1974 | Allen et al. | |
| 3,905,944 A * | 9/1975 | Finelli | 528/64 |
| 4,139,024 A | 2/1979 | Adorjan | |
| 4,258,791 A | 3/1981 | Brandt et al. | |
| 4,296,814 A | 10/1981 | Stalder et al. | |
| 4,438,072 A | 3/1984 | Nothnagel | |
| 4,475,847 A * | 10/1984 | Cornely et al. | 405/264 |
| 4,512,721 A | 4/1985 | Ayres et al. | |
| 4,523,044 A | 6/1985 | Commandeur et al. | |
| 4,621,838 A | 11/1986 | Kneidel et al. | |
| 4,693,313 A | 9/1987 | Stephenson et al. | |
| 4,984,635 A * | 1/1991 | Cullick et al. | 166/261 |
| 5,393,843 A | 2/1995 | Handlin, Jr. et al. | |
| 5,858,489 A | 1/1999 | Beauquin | |
| 7,025,093 B2 * | 4/2006 | Bonnet et al. | 138/149 |
| 2004/0060693 A1 | 4/2004 | Bass et al. | |
| 2005/0075437 A1 * | 4/2005 | Dinh et al. | 524/377 |
| 2010/0087566 A1 * | 4/2010 | Ballard | 523/130 |

FOREIGN PATENT DOCUMENTS

| | | |
|---|---|---|
| EP | 0 545 824 | 6/1993 |
| EP | 0 933 124 | 8/1999 |
| FR | 2 774 009 | 7/1999 |
| WO | WO 02/34809 | 5/2002 |

\* cited by examiner

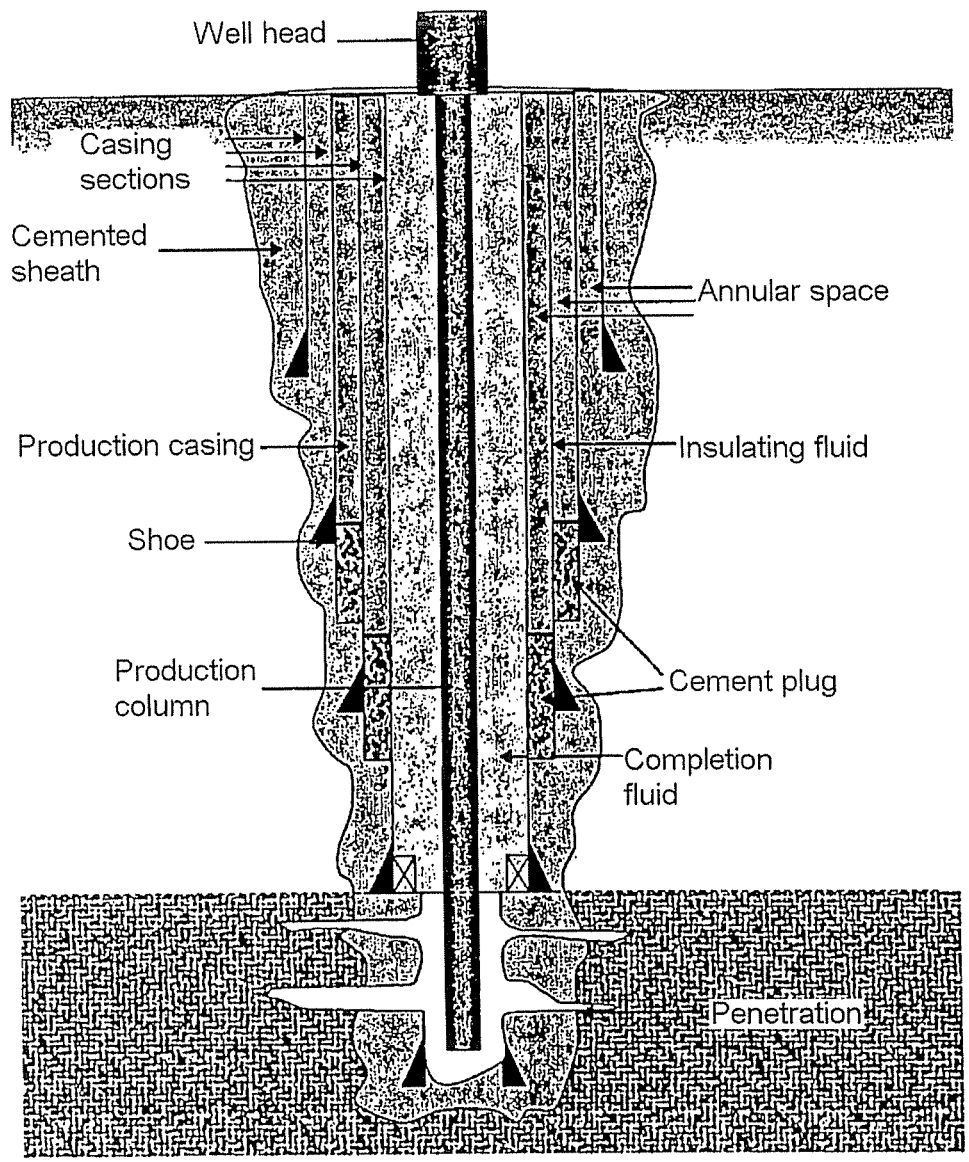

USE OF A FLUID COMPOSITION WITH DELAYED CROSS-LINKING FOR HOLDING A CASING INSIDE A DRILL HOLE AND METHOD FOR REINFORCING A DRILL HOLE

CROSS-REFERENCE TO RELATED APPLICATIONS

This application is a National Phase Entry of International Application No. PCT/FR2008/000842, filed on Jul. 17, 2008, which claims priority to French Application 07 04 376, filed on Jun. 19, 2007, both of which are incorporated by reference herein.

FIELD OF THE INVENTION

The present invention relates to the use of a cross-linkable composition in the form of a gel, with a controlled (generally delayed) cross-linking rate (in the form of a gelable or solidifiable fluid) as a material for fixing and thermally insulating tubes used for the casing in drill holes notably in oil drill holes, during well exploitation operations such as oil extraction operations.

TECHNOLOGICAL BACKGROUND OF THE INVENTION

During the setting up of production of an oil deposit, hydrocarbons flow in a duct, called a production column, from the bottom of the well up to the surface. At the bottom of the well, the pressure and temperature are relatively high, for example 100° C. and 300 bars. During the upward motion of the hydrocarbons towards the surface, these pressures and temperatures decrease with the result that the temperature at the outlet of the well is for example of the order of 30° C.

Thermal insulation of the well is particularly important since with it, it should be possible to ensure upward motion of the hydrocarbons recovered at the bottom of the well without the rheology of the hydrocarbons being notably modified. In particular, it is sought to maintain the temperature of the fluid at its fluidity temperature in order to avoid any problems of deposit and of plugging along the production column. These problems cause slowdowns in the production of hydrocarbons, including interruptions for intervention in the column, e.g. for scraping deposits. These delays in production generate rather considerable costs and should therefore be avoided as far as possible. Now, these production columns are installed in formations, the temperature of which may be very low. These low temperatures generally cause the setting of a certain number of hydrocarbon compounds, including paraffins in particular.

Moreover, when water is injected into the well, the intention may be to avoid its freezing or it may desired that it is not heated up by the soils of the formation which it crosses in order, for example, to maintain its weight and to cause certain favorable thermal phenomena, such as penetration of the deposit by embrittlement of the rock in regards to its thermal fracture. It may also be desired to avoid heat variations in the column upon stoppages of production that are likely to promote contractions of metal tubes or fracture of the cementation products.

Presently, thermal insulation and consolidation of the walls of a drill hole well are generally carried out by dual casing of the well, which consists of introducing two sets of stainless steel tubes placed concentrically as the well is gradually dug inside the formation. These concentric tubes form the casing sections of the production column. In a first phase, the tube touching the formation is cemented by injecting cement from the surface through the actual inside of the casing (the plugging method) or through drill rods (cementation currently designated by "inner string"). When a first so-called external tube is cemented to the formation, a second so-called internal tube with a smaller diameter is introduced and an insulating fluid is injected into the annular space formed by both of these concentric tubes. This insulating fluid has to gel or solidify in order to fill this space.

The first external tube has the main purpose of avoiding a caving-in of the walls of the well, of preventing inflows of water or gas into the drill hole, and of allowing the pressure and production of the well to be controlled; this is the casing of the well. With the second internal tube forming the casing, an annular space may be created in which a product or a mixture of products is placed, which is capable of thermally insulating the wall of the formation. Thus, any deterioration of the formation by heat transfer subsequent to the nearby passage of fluids with a high temperature as compared with that of the crossed formation is avoided whether the latter is in open air or under water. This annular space is generally filled from one of the ends of the duct, by pumping a liquid loaded with solid particles or by pumping a liquid gel.

Among the documents of the prior art, U.S. Pat. No. 4,258,791 describes a method for insulating a well that crosses very cold formations with a completion fluid introduced into the annular space described earlier. This fluid is then thickened in order to obtain the consistency of a grease by increasing the internal temperature of the drill hole duct, for a time determined to be required for this thickening. This completion fluid comprises a hydrocarbon oleaginous liquid phase resulting from oil refining, an aqueous phase, an oleophilic polymer of maleic anhydride and of a long-chain alpha-olefin, and a water-in-oil emulsifier. French Patent No. FR 2 741 420 describes a system for thermal and acoustic insulation of a duct of a well, which will become the production column. This system consists of an aerogel sleeve which surrounds the external tube over at least one portion of its length. The method for forming this sleeve comprises the steps for forming a liquid gel outside the well from a gel precursor and a liquid, replacing the liquid phase with a more volatile solvent promoting drying, and then removing the solvent contained in the gel in order to form the aerogel.

French Patent No. FR 2 774 009 and U.S. Pat. No. 4,438,072 propose installations for preparing and introducing the gel in the annular duct or as a sleeve around the casing or in the annular cavity. These preparation modes aim at modulating the nature of the gel depending on the depth and on the surrounding temperature of the casing. One of the important phases of these methods is not only mixing the products making up the gel, but rather causing gelling of the introduced compound at the suitable height and at the suitable time. This gelling is obtained by increasing the surrounding temperature of the gel, for example by injecting hot water or steam, or by injecting a more volatile solvent. The major difficulty is to be able to recover the introduced fluids by recycling the fluids in the column or by evaporation of the solvent. This is also the case in U.S. Pat. No. 4,296,814, which with the purposes of thermally insulating a drill hole well, proposes introducing through the end of the casing (external tube) either pierced or not with holes, a gelling composition between the tube and the crossed formation, and in a second step, introducing boiling water or steam in order to cause formation of the gel by a rise in temperature. The gels used in these documents are generally obtained from organometallic products in an aqueous solution or in an emulsion. However, it is customary to use pure polyurethane gels for filling the annular cavity of the production column either by depositing them on the outside of the casing, or by injecting them as an emulsion with water or in diluted form in a solvent. The risk is premature deposition of polyurethane particles formed on the walls of the tubes before arriving in the location in which the polymer should sediment or gel. Among the polyurethane gels used, U.S. Pat. No. 4,438,072 cites the mixtures of pre-polymers of polyisocyanate, in particular organic di-isocyanate with a diol or triol polyether such as glycerol or a glycol.

Moreover, in the more particular field of thermal insulation of ducts for transporting or transferring materials, patent WO 02/34809 describes the use of an insulating composition, as a gel of cross-linked polyurethane elastomer obtained by the reaction of polyol and polyisocyanate in the presence of an organic filler that is chemically inert towards isocyanates. In this document, the cited embodiments are the injection or pre-molding with the insulating composition in order to make thermally insulated, more or less flexible transfer ducts, which may be wound on reels, with perfect adhesion of the molded insulating material and a guaranteed seal of the assembly.

No application to the field of consolidation and insulation of oil drill wells is cited. Thus, in the field of oil drill wells, from all the techniques mentioned earlier, either difficulties arise for having the right mixtures arrive in the right locations, or difficulties arise for having the products sediment or gel at the right time, or for recovering the fluids required for these gel formations or sedimentations. Thus, the drill holes of the wells have many technical difficulties and many subsidiary implementation costs. These costs correspond to difficulties in handling these fluids, which decant, plug, or deposit where they should not, before reaching their final destination, in order to accomplish their final purpose which consists of fixing insulating tubings and/or casings of the production column.

From all the aforementioned techniques, it emerges that the major drawback is the duration for setting into place the drill hole well. Indeed, the times for drilling and consolidating a drill hole well are long since the progression of the drilling depends on the time required for tubing and casing each drilling section. It is only possible to pass on to the next section when the cementation and completion operations for each section over the whole of its casing length have been completed and this until the last drilled section is reached.

The object of the present invention is to provide a solution for finding a remedy to the major problem of the duration for setting into place a drill hole well. This solution also provides advantages in terms of improvement in the consolidation of the well, improvement in productivity, and in simplification of the implementation on location.

SUMMARY OF THE INVENTION

For this purpose, the present invention proposes the use of a cross-linkable composition with controlled, preferably delayed cross-linking, as a material for consolidating and thermally insulating the tubes used for the casing of drill hole wells, notably in oil wells, during operations for exploiting the well, such as oil extraction operations. By consolidation, is meant the operation which consists of consolidating the wall of the well by introducing and fixing tubes along the wall during the casing, after or during the drilling of a well, by at least injecting into the annular space comprised between the soil and a tube a certain amount of said cross-linkable composition. This composition is easy to set into place, it adapts to differences in temperatures and pressures which vary gradually while progress is made in the well, and especially to the drilling conditions (ground or seabed).

This cross-linkable composition with controlled (in particular delayed) cross-linking comprises:
a) at least one diene polyol, and
b) at least polyisocyanate with a functionality of at least 2, these components being the precursors of a cross-linked polyurethane formed in situ in said composition, and
c) at least one thermally insulating liquid filler, chemically inert towards said polyisocyanate and polyol.

This composition is therefore used for fixing the casing for the consolidating and thermally insulating a drill hole well (see FIG. 1) comprising several casing sections of different heights and several annular spaces, said annular spaces being formed by the space between the soil and at least one tube and/or two tubes of a casing section. A use in which the composition with controlled (in particular delayed) cross-linking occupies at least one portion of the height of a casing section and at least one of the annular spaces present in the drill hole well is also described.

Within the scope of the invention, the composition is capable of giving a moldable insulating gel in said spaces and sections of said drill hole well. The cross-linkable composition used in the invention is capable of being injected into the well by means of a pump and has a dynamic viscosity measured according to the EN ISO 3104 standard of less than 3,000 mPa·s, preferably less than 1,000 mPa·s, or further preferably less than 600 mPa·s. Preferably, this pumpability of the composition is maintained for 1 to 48 hours, preferably between 5 and 30 hours, in a temperature range from −20° C. to 200° C. and a pressure range from atmospheric pressure to a pressure of 300 bars.

According to an embodiment, the composition comprises at least one diene polyol, at least one polyisocyanate with a functionality of at least 2, at least one inert liquid filler, and optionally a cross-linking retardant. Preferably, the diene polyol is a hydroxylated polybutadiene with an average molecular mass equal to 7,000, preferably from 1,000 to 3,000 and has a functionality ranging from 1 to 5, preferably from 1.8 to 3. According to a preferred embodiment, the cross-linkable composition with controlled, preferably delayed, cross-linking used in the invention, comprises at least 7%, preferably 10% to 30% by weight of polyurethane and at least 50%, preferably 60% to 93% by weight of an inert liquid filler.

According to a particular embodiment, the molar ratio NCO/OH between the number of moles of isocyanate function over the number of moles of OH functions of the polyol component is comprised between 0.5 and 2, preferably from 0.65 to 1.20. According to a particular embodiment the liquid inert filler is a composition comprising at least one hydrocarbon distillate, the carbon chain of which comprises from 12 to 19 carbon atoms. Preferably, the hydrocarbon distillate has a level of aromatic or aromatic carbon compounds of less than 0.03%. According to a particular embodiment, the hydrocarbon distillate has a level of aromatic or aromatic carbon compounds of less than 0.03% and a carbon chain form 12 to 16 carbon atoms, preferably from 13 to 15 or from 13 to 16 carbon atoms.

According to another object, the invention relates to a method for fixing at least one casing section of a drill hole well comprising:
(a) pumping by means of a pump for a viscous product and injecting into the well a composition with controlled, preferably delayed cross-linking, comprising the mixture of at least one diene polyol, at least one polyisocyanate having a functionality of at least 2, optionally a cross-linking retardant and at least one inert liquid filler, (b) filling the whole or part of the annular space located between the two tubes of a casing section;

(c) optionally, before the end of the filling of the annular space, sending cement in order to maintain said composition before its complete cross-linking;

(d) closing the lower space of the casing section.

According to another object, the invention relates to a method for consolidating a drill hole well comprising the application of the method described above as many times as required depending on the number of casing sections to be fixed in the drill hole well from the head of the well down to the reservoir formation. According to a particular embodiment, the methods described above are applied with a composition with controlled, preferably delayed cross-linking, the characteristics of which are as defined above.

Thus, the present invention provides a solution with which the drilling rate may be accelerated, by mainly acting on the rate for fixing the casing while maintaining the thermal insulation required for the final production column. This gain in rate is carried out by reducing during the step for casing the well, the number of steps required for forming the insulation gel, in particular during drillings of off-shore wells, notably those in deep waters located far from the production platforms. Further, this reduction in the number of steps also has the advantage of the use of long casing sections, of weight reduction related to the insulation, of obtaining wells which are more solid over time, the risks of fractures of the cementation material being more limited. On the whole, these improvements have the advantage of limiting the handling costs.

This solution has advantages.
The composition with controlled (in particular delayed) cross-linking uses components already on the site of oil production. The composition with controlled (in particular delayed) cross-linking may easily be handled since it remains fluid and is pumpable during a sufficiently long time so as to be set into place on the whole of the casing sections of a drill hole well. Consequently, the casing sections may be longer than those customarily used. Further, the composition does not contain many new chemicals and resorts for more than 50% by weight of its composition to fluids also used in forming drill hole sludges. This element is particularly important when the surfaces for storing these products are reduced, notably on off-shore platforms.

The composition according to the invention remains fluid and is therefore pumpable at least for the time required for injection, over wide ranges of temperature and pressure with excellent capability of perfectly filling the insulation space independently of its shape. Indeed, the composition is initially fluid for the pumping and filling and is then cross-linkable in a controlled (in particular delayed) way over time in order to form a moldable gel which perfectly fits the shape of the insulation space. The pumping and injection times are parameterized so that the end of the cross-linking occurs as early as possible at the moment when the fluid reaches its final position, which allows the casing to be fixed and consolidated. Unlike what was done previously, there is no need to resort to solvents which have to be removed or to send fluids in charge of causing cross-linking by increasing the temperature of the medium.

Cross-linking is a self-contained phenomenon with its own kinetics (cross-linking rate) which depends on the formulation of the composition used. The external temperature or pressure conditions which are imposed only have an accelerating or delaying effect on the cross-linking. Thus, in order to better control the cross-linking rate, notably when the insulation fluid has to reach temperatures above 80° C., the cross-linking may be delayed by various means, for example by adjusting (increasing) the dilution by the inert filler in a given range.

Next, once the composition is in place, cross-linking is initiated and accelerated in order to produce a composition as a homogenous gel (with a behavior between a liquid and a solid) which allows the casing to be fixed and consolidated. Indeed, said gel is a solid with the advantages of a liquid. Like a liquid, it is incompressible (especially from the fact of the swelling of the polyurethane three-dimensional lattice by the inert liquid filler) while being deformable in order to assume the shape required without creeping or exudation of the pressurized liquid filler. It is also an elastic and flexible solid with very good absorption of mechanical and acoustic vibrations. Depending on the cross-linking rapidity of the composition once it is in place, the drillings may be faster.

The composition with controlled (in particular delayed) cross-linking has lower density and consistency (viscosity) than the cements customarily used, which allows the wells to be made lighter. Indeed, taking into account the density of cements, the cement column weight in a conventional well may attain 500 tons per well, and with the compositions of the invention a gain in weight of the order of 3 to 10 times less than that of cement may be obtained. The composition with controlled (in particular delayed) cross-linking has a lower heat conductivity than that of cement, which makes it a much better thermal insulator over the whole height of the relevant casing section. Consequently, as the temperature variation along the column is reduced, each drill hole section may be longer and on the whole the number of drill hole sections required for reaching the formation may be reduced. The composition with controlled (in particular delayed) cross-linking also has a compromise between flexibility (deformability) and better mechanical strength than that of cements generally used, which allows better absorption of impacts or tremors of the columns during drillings and caving-ins may thereby be avoided, generally due to degradation of the cement by disintegration.

DETAILED DESCRIPTION OF THE EMBODIMENTS OF THE INVENTION

The Composition with Delayed Cross-Linking and its Characteristics

The cross-linkable and injectable insulating composition according to the present invention comprises at least one diene polyol, preferably a polyol homopolymer and/or copolymer of polybutadiene and/or of isoprene, at least one polyisocyanate having a functionality of at least 2, preferably from 2 to 4, and a sufficient amount of at least one liquid filler inert towards said polyisocyanate, said cross-linkable composition being injectable into the well by means of a pump. This composition, which is injectable into the well by means of a pump, has, before cross-linking and for the whole duration of the application (in situ) of said composition, a dynamic viscosity measured according to the EN ISO 3104 standard which may change but which advantageously remains less than 3,000 mPa·s, preferably less than 1,000 mPa·s, or still preferably less 600 mPa·s.

The composition with controlled (in particular delayed) cross-linking comprises:
at least 7%, preferably 10 to 30% by weight of polyurethane resulting from the reaction of said diene polyol with said polyisocyanate, and at least 50%, preferably 60 to 93% by weight of said inert liquid filler;

these percentages are given relatively to the total weight of the composition.

The cross-linkable composition of the present invention may be produced by simply mixing, at room temperature (generally between 15 to 25° C., preferably to about 20° C.), the different constituents by any sufficient stirring means for ensuring good dispersion, and especially a homogenous dispersion, of the constituents. The composition may contain one or more additives such as antioxidants, and corrosion inhibitors. Depending on the particular cases, e.g. for relatively low temperature conditions (low depths close to the surface) the cross-linking rate may be adjusted (accelerated) by means of a catalyst of the polyol isocyanate reaction, such as tertiary amines of corresponding ammonium salts or tin salts such as tin dibutyl dilaurate (TDBDL). The effect will be adjusted depending on the nature and especially on the amount of this catalyst. Such a catalyst may also present for the highest levels of liquid filler (slower cross-linking requiring acceleration).

After the end of the cross-linking, the composition according to the present invention is found as a homogenous, elastically deformable and incompressible gel with perfect adherence to the walls to be insulated and perfect filling of the insulation space between concentric tubes. This composition has heat insulation, density, flexibility and hardness properties compatible with the conditions of use in drill hole wells. Indeed, the pumpability of the composition remains effective for 1 to 48 hours, preferably between 5 and 30 hours, in a temperature range from −20° C. to 200° C. and a pressure range from atmospheric pressure to a pressure of 300 bars.

The Diene Polyol

According to the present invention, the diene polyol is a hydroxytelechelic oligomer based on homopolymers and/or copolymers of conjugated dienes which may be obtained by various methods such as radical polymerization of conjugated dienes having from 4 to 20 carbon atoms in the presence of a radical polymerization initiator such as hydrogen peroxide or an azo compound such as azobis-2,2-[methyl-2,N-(hydroxyl-2-ethyl)propionamide] or by anionic polymerization of conjugated dienes having from 4 to 20 carbon atoms in the presence of an anionic polymerization initiator, such as dilithium naphthalene or bifunctional anionic initiators as described in U.S. Pat. No. 5,393,843. According to the present invention, the conjugated diene of the diene polyol may be selected from the group comprising butadiene, isoprene, and chloroprene. Preferably said diene polyol is a homo- and/or co-polymer of butadiene and/or isoprene. The hydroxytelechelic copolymers of butadiene and/or isoprene may comprise other comonomers in adjustable proportions, comonomers selected for example from vinylaromatic monomers. Such comonomers may be useful for adjusting the compromise between flexibility and mechanical strength of the cross-linked polyurethane.

There would not be any departure from the invention if hydroxytelechelic oligomers of conjugated dienes epoxidized on the chain as well as hydroxytelechelic hydrogenated oligomers of conjugated dienes were used. According to the present invention, the diene polyols may have number average molecular masses $M_n$ at most equal to 7,000 and preferably from 1,000 to 3,000 and functionalities from 1 to 5 and preferably from 1.8 to 3. Their dynamic viscosity measured at 30° C. may be at least equal to 600 mPa·s: As an illustration of diene polyols, mention will be made of the hydroxylated polybutadiene marketed by Sartomer Company, Inc. under the names of POLY BD® R45HT hydroxyl terminated polybutadiene and POLY BD® R20LM low molecular weight hydroxyl terminated polybutadiene.

According to the present invention, the composition may comprise in addition to diene polyol, one of more polyols of low molar mass. Low molar mass polyols are polyols having number average molecular masses $M_n$ from 50 to 800. As an illustration of such polyols, mention may be made of ethylene glycol, propylene glycol, diethylene glycol, dipropylene glycol, polyetherpolyols, butane-diol-1,4, hexanediol-1,6, ethyl-2-hexane-diol-1,3, N,N-bis(hydroxyl-2-propyl)aniline, methyl-3-pentane-diol-1, trimethylolpropane, pentaerylthritol, propoxylated bisphenol A marketed by AKZO under the name of DIANOL 320, and the mixture of at least two aforementioned polyols. In the event that a low molar mass polyol is used, the molar ratio NCO/OH will have to be calculated so that OH represents the totality of the OH functions including the hydroxyl functions provided by said low molecular mass polyol.

The Polyisocyanate

The polyisocyanate used may be selected from aromatic, aliphatic, cycloaliphatic polyisocyanates and those which contain in their molecule an isocyanurate ring, having at least isocyanate functions in their molecule. The polyisocyanate is capable of reacting with hydroxyl functions of a polyol in order to form a three-dimensional polyurethane lattice causing cross-linking of the composition.

As an illustration of aromatic polyisocyanates which may be used according to the present invention, mention will be made of 4,4'-diphenylmethane diisocyanate (MDI), polymeric MDIs, and triphenyl-methane triisocyanate. As an illustration of an aliphatic polyisocyanate which may be used according to the present invention, mention will be made of the biuret of diisocyanate-1,6-hexane. As an illustration of cycloaliphatic polyisocyanate, mention will be made of isophorone diisocyanate (IPDI), cyclohexyl diisocyanate (CHDI), and 4,4-dicyclohexylmethane diisocyanate.

A polymeric polyisocyanate may also be used, which comprises in its chain at least two units each bearing at least one isocyanate function. Also, an oligo-urethane prepolymer bearing at least two isocyanate functions and preferably at least three isocyanate functions may also be used, which may be obtained by a reaction of a diol with a polyisocyanate under conditions of excess isocyanate functions (for example with a NCO/OH of at least 2). As an illustration of polyisocyanates which contain in their molecule the isocyanurate ring, mention will be made of trimers of hexamethylene diisocyanate marketed by RHODIA under the name of TOLONATE HDT, and tris[1-(isocyanatomethyl)-1,3,3-trimethylcyclohexane]isocyanurate marketed by HULS under the name of VESTANAT T 1890/100.

The Polyurethane

In order to prepare the polyurethane gel according to the invention, the amounts of polyisocyanate and of diene polyol according to the present invention are selected so that the molar ratio between the number of moles of isocyanate function over the number of moles of OH function of the polyol component (NCO/OH) is close to 1, and preferably between 0.5 and 2, preferably from 0.65 to 1.20. In order to form a cross-linked structure, the average functionality of the isocyanate+alcohol reaction mixture should be greater than 2, which may be obtained with a polyisocyanate of a functionality greater than 2 and a polyol of a functionality of 2, or vice versa.

The Inert Liquid Filler

According to the present invention, the organic filler that is chemically inert towards polyisocyantes, is a thermally insulating liquid, compatible with polyols and polyisocyanates.

This insulating liquid filler may be selected from plasticizers, such as hydrocarbon oils, resins and derivatives, hydrocarbons or fuels, alkylbenzenes and liquid esters.

The liquid filler for at least one portion is made up from the following.

1) Amorphous or semi-crystalline paraffins (with a melting point<50° C.), including animal waxes, plant waxes (for example candilla, carnauba waxes, made up in majority from a mixture of aromatic and aliphatic esters), mineral paraffins and synthetic paraffins (polyethylene waxes, chlorinated paraffins). The "mineral" paraffins derived from petroleum are preferred. More preferentially, these are $C_{11}$-$C_{25}$ normal or iso-paraffins, and mixtures thereof. Typical examples are mixtures of paraffins, and mixtures of at least one paraffin such as n-heptadecane, n-octadecane, n-nonadecane, n-eicosane, n-heneicosane, n-docosane, with at least one of the corresponding iso-paraffins.

2) Most particularly $C_5$-$C_{12}$ naphthene resins or oils. Naphthene oils are also petroleum derivatives which are hydrogenated liquid $C_5$-$C_{12}$ derivatives. A mineral oil actually consists of paraffins, naphthenes, aromatics and polyaromatics. As described above, the paraffins are n-alkanes or branched alkanes. The naphthene structure in fact is a cycloalkane with at least one ring with 6 carbons (or even 5 or 7). Finally, in aromatic derivatives, a distinction is made between aromatics or polyaromatics. Generally two types of crude oils are distinguished; naphtene oils and aromatic oils.

3) Alkylbenzenes such as decylbenzenes, dodecylbenzenes.

4) Esters which for example are reaction products of polyvalent alcohols such as pentaerythritol with monovalent carboxylic acids such as n-heptanoic acid; alkyl phthalates such as dibutyl and diethyl phthalate.

5) Alkylpolyaromatic compounds such as the mixture of dibenzyltoluene isomers (DBT), monoisopropylbiphenyl (MIPB), phenylxylylethanes (PXEs); mixtures of benzyltoluenes and dibenzyltoluenes such as those notably described in European patent EP 136230; mixtures of mono- and bis-(methyl-benzyl)xylenes such as those described in European patent application EP 0500345; mixtures of benzyltoluene and of diphenylethane.

6) Plant oils such as rapeseed oils and maize oils, as well as the combination of at least two of the aforementioned insulating liquids.

Preferably inert fillers are selected from heavy and light fuels and more particularly kerosine, gas oils and domestic fuels. Preferably, naphthenic oils or mixtures of n-paraffins and isoparaffins will be used as a chemically inert organic filler. According to an embodiment of the present invention, the chemically inert liquid filler is a composition comprising at least one hydrocarbon distillate, the carbon chain of which comprises from 8 to 25 carbon atoms, preferably from 13 to 15 or from 13 to 16 carbon atoms and with a boiling point varying from 180 to 370° C., preferably from 200 to 350° C. According to an embodiment, the hydrocarbon distillate has a rate of aromatic or aromatic carbon compounds of less than 0.03%.

The Cross-Linking Retardant

In the event when a cross-linking retardant is used as a partial or total replacement for an aromatic isocyanate, the latter may be selected from the group comprising aliphatic or cycloaliphatic isocyanates. As an illustration of a preferred retardant compound, mention may be made of a cycloaliphatic polyisocyanate such as isophorone diisocyanate (IPDI). In the case when a less reactive polyisocyanate is totally used, one should make sure that the formulation of the composition is adjusted in order to obtain a gel which is finally homogenous, i.e. a transparent gel, free of solid particles. The introduction of a delayed effect, apart from any adjustment of the formulation (for example its dilution) and with which a suitable homogenous gel may further be obtained, may also comprise at least partial use of an isocyanate blocked by a blocking agent (for example isocyanate blocking agents releasing it at a temperature t°<120° C.: hydroxamates as described in EP 545824 page 2 line 19 to page 3 line 9 which are thermally unblocked from a given working temperature, said temperature depending on the blocking agent used).

This is compatible with the idea of using this delaying effect for large depths where the imposed temperature and pressure are the highest with the consequence of uncontrolled acceleration of the cross-linking. With such a delaying effect, it is possible to solve satisfactorily this type of problem more specific to great depths. Thus, the nature of the blocking agent and the rate of blocked isocyanate and/or the dilution rate by the liquid filler may be parameters for controlling this cross-linking rate at greater depths so as to avoid premature gelling of the composition before filling the space to be insulated.

Method for Fixing the Casing

The method for fixing at least one casing section of a drill hole well comprises the following steps:

(a) pumping the composition by means of a pump for a viscous product allowing injection into the well, and injecting into the well a composition with controlled, and more particularly delayed, cross-linking, the composition comprising the mixture of at least one diene polyol, at least one polyisocyanate with a functionality of at least 2 and preferably greater than 2, optionally a cross-linking retardant (or accelerator depending on the case) and at least one insulating liquid filler inert towards isocyanate;

(b) filling the whole or part of the annular space located between the two tubes of a casing section;

(c) optionally, before the end of filling the annular space, sending cement, in order to maintain said composition before its complete cross-linking; and (d) closing the lower space of the casing section.

In order to consolidate the whole of the drill hole well, the method is applied in order to fix at least one casing section of the method at least as many times as required depending on the number of casing sections to be fixed in the drill hole well from the head of the well down to the reservoir formation. The number of casing sections in a well may vary depending on the nature of the soil crossed. Preparation of the composition is carried out on the platform and the time between the end of the preparation of the composition and its setting into place in the first annular space or even up to the end of the setting into place of the whole of the casing sections may be quite compatible with the time available before cross-linking of the composition.

Of course the present invention is not limited to the examples and to the embodiments, as described and illustrated, but many alternatives thereof accessible to one skilled in the art are possible.

EXAMPLES

Example 1

Exemplary Embodiment of Cross-Linkable Compositions Used in the Invention and their Properties The compositions may be obtained according to the procedure, which consists of preparing separately a first mixture M1 containing at least one liquid inert filler (a $C_{13}$-$C_{16}$ hydrocarbon distillate) and at least one di- or poly-isocyanate and a second portion M2 containing at least one diene polyol in such a way that a molar ratio NCO/OH of 1.05 is obtained. Next, M1 and M2 are mixed in a device ensuring good mixing of both portions (such as a static mixer), and the compositions are then abandoned at room temperature (20° C.) and the viscosity is recorded versus time. Another method for preparing the composition of the invention consists of mixing simultaneously the different constituents by means of a device ensuring good mixing of the constituents.

The density, heat conductivity, hardness, flexibility properties of the compositions at different polyurethane concentrations are then evaluated and compared with those of cement (see Table 1). Next their initial viscosity V0 is determined at t=0 in Pa·s, their final viscosity Vf in Pa·s, and their gelling time Tgel at different temperatures (see Table 2). The gelling time Tgel expressed in days or hours is noted, which corresponds to the instant when the composition is totally cross-linked.

TABLE 1

|  | Cement | Cross-linkable compositions in % by weight | | |
| --- | --- | --- | --- | --- |
|  |  | 15% gel | 20% gel | 30% gel |
| $C_{13}$-$C_{16}$ distillates |  | 85 | 80 | 70 |
| Polybd R45 HTLO |  | 15 | 20 | 30 |
| M143 |  | 2.5 | 3.3 | 5 |
| density kg/m$^3$ (EN ISO 12185) | 1.9 | 0.83 | 0.84 | 0.85 |
| Heat conductivity W/m °K (EN ISO 8302) | 0.3-1.5 | 0.135 | ND | 0.145 |

POLY BD® R45HTLO is a hydroxylated polybutadiene with Mn equal to 2,800 (determined by steric exclusion chromatography), having an OH hydroxyl number expressed in milliequivalents per gram (meq./g) equal to 0.83, a viscosity equal to 5,000 mPa·s at 30° C. and a density equal to 0.90. M143 is an MDI polymer sold by Dow Chemical.

TABLE 2

|  | 15% gel | | | 20% gel | | | 30% gel | | |
| --- | --- | --- | --- | --- | --- | --- | --- | --- | --- |
|  | Vo | Vf | Tgel | V0 | Vf | Tgel | V0 | Vf | Tgel |
| 25° C. | 6 | 60 10$^3$ | 54 | 13 | 130 10$^3$ | 25 | 38 | 380 10$^3$ | 16 |
| 60° C. | 3 | 30 10$^3$ | 14.5 | 6 | 60 10$^3$ | 6.5 | 13 | 130 10$^3$ | 3.5 |
| 100° C. | 2 | 20 10$^3$ | 5 | 3 | 30 10$^3$ | 1.2 | 6 | 60 10$^3$ | 1 |

The viscosities V0 and Vf are expressed in mPa·s. All the gelling times are expressed in hours. The results show that the compositions with delayed cross-linking have a lower density than the cements customarily used, a lower heat conductivity than that of cement, which makes it a much better heat insulator.

The invention claimed is:

1. A method for fixing at least one casing section of a drill hole well, said method comprising:
    a) introducing a tube in the drill hole well;
    b) pumping with a PUMP for a viscous product and injecting into the well a composition with controlled cross-linking, comprising the mixture of at least one diene polyol, at least one polyisocyanate having a functionality of at least 2, optionally a cross-linking retardant and at least one inert liquid filler;
    c) filling the whole or part of the annular space located between the ground and said tube with said composition, wherein at completion of cross-linking of said composition, said tube is fixed to the ground by the cross-linked composition;
    d) optionally before the end of the filling of the annular space, sending cement, for maintaining said composition before its complete cross-linking; and
    e) closing the lower space of the casing section.

2. The method for consolidating a drill hole well comprising the application of the method according to claim 1 as many times as required depending on the number of casing sections to be fixed in the drill hole well from the head of the well down to the reservoir formation.

3. The method according to claim 1 wherein the composition with controlled delayed cross-linking further comprises at least one heat insulating liquid filler, chemically inert towards the polyisocyanate and polyol.

4. The method according to claim 1, wherein the tube is maintained in the drill hole well after step e).

5. Casing sections of a drill hole well, said casing sections comprising several concentric tubes of different heights and several annular spaces formed by the space between the ground and at least one tube, by the space between two tubes, or both;
    wherein at least one portion of the height of a casing section and at least one of the annular spaces is occupied by a composition with controlled cross-linking, said composition comprising:
    a) at least one diene polyol;
    b) at least one polyisocyanate with a functionality of at least 2,
        these components being the precursors of a cross-linked polyurethane formed in situ in said composition; and
    c) at least one heat insulating liquid filler, chemically inert towards said polyisocyanate and polyol,
        said composition being injectable into the well by a pump and having a dynamic viscosity of less than 3,000 mPa$_x$s, and
        the pumpability of the said composition being maintained for 1 to 48 hours, in a temperature range from −20° C. to 200° C. and a pressure range from atmospheric pressure to a pressure of 300 bars,
    wherein a first tube is fixed to the ground by the composition when cross-linked, and a second tube is fixed to the first tube by the composition when cross-linked.

6. Casing sections according to claim 5, wherein the composition is capable of giving a moldable insulating gel in said spaces and sections of said drill hole well.

7. Casing sections according to claim 5,
    wherein the cross-linkable composition with delayed cross-linking is injectable into the well by said pump and has a dynamic viscosity of less than 1,000 mPa$_x$s.

8. Casing sections according to claim 5, wherein the pumpability of the composition is maintained for between 5 and 30 hours, in a temperature range from 20° C. to 200° C., and a pressure range from atmospheric pressure to a pressure of 300 bars.

9. Casing sections according to claim 5, wherein the diene polyol is a hydroxylated polybutadiene of a number average molecular mass at most equal to 7,000 and has a functionality from 1 to 5.

10. Casing sections according to claim 5, wherein the cross-linkable composition with controlled cross-linking, comprises at least 7%, preferably 10 to 30% by weight of polyurethane and at least 50% by weight of inert liquid filler.

11. Casing sections according to claim 5, wherein a molar ratio NCO/OH between the number of moles of isocyanate function over the number of moles of OH functions of the polyol component, is comprised between 0.5 and 2.

12. Casing sections according to claim 5, wherein the liquid inert filler is a composition comprising at least one hydrocarbon distillate, a carbon chain of which comprises from 12 to 19 carbon atoms.

13. Casing sections according to claim 12, wherein the at least one hydrocarbon distillate has a rate of aromatic or aromatic carbon compounds of less than 0.03%.

14. Casing sections according to claim 12, wherein the at least one hydrocarbon distillate has a rate of aromatic or aromatic carbon compounds of less than 0.03% and a carbon chain from 12 to 16 carbon atoms.

15. A method for fixing at least one casing section of a drill hole well, said method comprising:

a) introducing a first tube in the drill hole well, thereby forming an annular space between ground and said first tube;
b) pumping with a pump for a viscous product and injecting into the well a composition with controlled cross-linking, comprising the mixture of at least one diene polyol, at least one polyisocyanate having a functionality of at least 2, optionally a cross-linking retardant and at least one inert liquid filler;
c) filling the whole or part of the annular space located between the ground and said first tube with said composition, wherein at completion of cross-linking of said composition, said tube is fixed to the ground by the cross-linked composition;
d) introducing in the drill hole well a second tube concentric with the first tube and having a height different from the first tube;
e) filling the whole or part of the annular space located between the two concentric tubes with said composition, wherein at completion of cross-linking of said composition, said second tube is fixed to the first tube by the cross-linked composition;
f) optionally before the end of the filling of the annular space in step c) or e), sending cement, for maintaining said composition before its complete cross-linking; and
g) closing the lower space of the casing section.

16. The method according to claim 15, wherein the first tube and the second tube are maintained in the drill hole well after step g).

\* \* \* \* \*